United States Patent
Kang

(10) Patent No.: US 8,928,844 B2
(45) Date of Patent: Jan. 6, 2015

(54) PIXEL UNIT AND LIQUID CRYSTAL DISPLAY PANEL

(75) Inventor: Chihtsung Kang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 615 days.

(21) Appl. No.: 13/264,883

(22) PCT Filed: Jun. 24, 2011

(86) PCT No.: PCT/CN2011/076247
§ 371 (c)(1),
(2), (4) Date: Oct. 17, 2011

(87) PCT Pub. No.: WO2012/167455
PCT Pub. Date: Dec. 13, 2012

(65) Prior Publication Data
US 2012/0314149 A1    Dec. 13, 2012

(30) Foreign Application Priority Data
Jun. 9, 2011    (CN) .......................... 2011 1 0154388

(51) Int. Cl.
*G02F 1/1337*    (2006.01)
*G02F 1/1343*    (2006.01)
*G02F 1/139*    (2006.01)

(52) U.S. Cl.
CPC ........ *G02F 1/134336* (2013.01); *G02F 1/1393* (2013.01); *G02F 2201/122* (2013.01)
USPC ............................ 349/129; 349/141; 349/146

(58) Field of Classification Search
CPC ..................... G02F 1/133753; G02F 1/133707
USPC ......................................... 349/129, 141, 146
See application file for complete search history.

(56) References Cited

U.S. PATENT DOCUMENTS

2008/0024710 A1 *    1/2008    Moon et al. ................... 349/141

FOREIGN PATENT DOCUMENTS

| CN | 101446726 A | 6/2009 |
|---|---|---|
| CN | 101770117 A | 7/2010 |
| CN | 101806981 A | 8/2010 |
| CN | 101968582 A | 2/2011 |
| CN | 101995717 A | 3/2011 |
| JP | 2006189610 A | 7/2006 |

* cited by examiner

*Primary Examiner* — Jessica M Merlin
(74) *Attorney, Agent, or Firm* — Muncy, Geissler, Olds & Lowe, P.C.

(57) ABSTRACT

The present invention discloses a pixel unit and has: a gate line; a source line; a drain line; an active element electrically connected to the gate line, the source line and the drain line; a pixel electrode including a main trunk and multiple stripped electrodes, and the main trunk is electrically connected to the drain line, the main trunk has a first predetermined angle with respect to a first polarization axis or a second polarization axis, and the main trunk at least has two segments, an end of each of the strip electrodes is connected to the main trunk and each of the strip electrodes has a second predetermined angle with respect to the main trunk. The present invention further discloses a liquid crystal display panel.

12 Claims, 7 Drawing Sheets

PIXEL UNIT AND LIQUID CRYSTAL DISPLAY PANEL

CROSS-REFERENCE TO RELATED APPLICATIONS

This application is the National Stage of International Patent Application No. PCT/CN2011/076247 filed Jun. 24, 2011, which claims the benefit of Chinese Patent Application No. 201110154388.7, filed Jun. 9, 2011, the disclosures of which are incorporated herein by reference in their entireties.

FIELD OF THE INVENTION

The present invention relates to a liquid crystal display device, and more particularly to a pixel unit of a display device; the present invention further relates to a display panel, and especially a liquid crystal display panel.

BACKGROUND OF THE INVENTION

A pixel area of a conventional liquid crystal panel generally uses a cross-shaped transparent conductive electrode as a main trunk, and a strip electrode has an angle of 45 degrees in inspect with the main trunk, and the cross-shaped main trunk is parallel with or perpendicular to a first polarization direction and a second polarization direction. As shown in FIG. 1, because of a twisting effect of liquid crystal, a cross-shaped dark area corresponding to the main trunk will occur in the pixel area and affect a display effect of the liquid crystal panel.

Besides, the twisting direction of liquid crystal is continuously changing, electric fields produced in a middle area and in a side area of the main trunk of the pixel electrode are different from each other, if the main trunk of the pixel electrode is too wide or too long, or the voltage applied on the pixel electrode is not enough, liquid crystal in a center area of the main trunk of the pixel electrode will not twist with an enough angle, and thereby leads to occurrence of an apparent dark area on an area that the main trunk corresponds to, and it reduces transmittance and affects display effect of the liquid crystal panel.

Hence, it is necessary to provide a pixel unit and a liquid crystal display panel to overcome the problems existing in the conventional technology.

SUMMARY OF THE INVENTION

An object of the invention is to provide a pixel unit which has a main trunk that corresponds to an area without apparent dark zone, even no dark zone, so as to increase transmittance of liquid crystal display panel and improve the display effect of the liquid crystal display panel.

In order to solve the foregoing problem, the present invention provides a pixel unit comprising: a gate line; a source line; a drain line; an active element electrically connected to the gate line, the source line and the drain line; a pixel electrode including a main trunk and multiple strip electrodes; the main trunk is electrically connected to the drain line; the main trunk has a first predetermined angle with respect to a first polarization axis or a second polarization axis; and the main trunk at least has two segments; an end of each of the strip electrodes is connected to the main trunk; and each of the strip electrodes has a second predetermined angle with respect to the main trunk; the first predetermined angle is ranged from 5 to 85 degrees, and the second predetermined angle is ranged from 5 to 175 degrees; the main trunk at least has two segments along a first direction, and an end of each of the segments has a protrusion or an indent, and the first direction is parallel to a line along which one of the segments of the main trunk is oriented; or the main trunk at least has two segments along a second direction, and the two segments are crossed with each other, and the main trunk has a gap between the two segments, and the second direction is perpendicular with a line along which one of the segments of the main trunk is oriented.

In the pixel unit of the present invention, the first predetermined angle is 45 degrees.

In the pixel unit of the present invention, the second predetermined angle is 90 degrees.

Another object of the invention is to provide a pixel unit which has a main trunk that corresponds to an area without apparent dark zone, even no dark zone, so as to increase transmittance of liquid crystal display panel and improve the display effect of the liquid crystal display panel.

In order to solve the foregoing problem, the present invention provides a pixel unit comprising: a gate line; a source line; a drain line; an active element electrically connected to the gate line, the source line and the drain line; a pixel electrode including a main trunk and multiple strip electrodes; the main trunk is electrically connected to the drain line; the main trunk has a first predetermined angle with respect to a first polarization axis or a second polarization axis; and the main trunk at least has two segments; an end of each of the strip electrodes is connected to the main trunk; and each of the strip electrodes has a second predetermined angle with respect to the main trunk.

In the pixel unit of the present invention, the first predetermined angle is ranged from 5 to 85 degrees, and the second predetermined angle is ranged from 5 to 175 degrees.

In the pixel unit of the present invention, the main trunk at least has two segments along a first direction, and the first direction is parallel to a line along which one of the segments of the main trunk is oriented; or the main trunk at least has two segments along a second direction, and the two segments are crossed with each other, and the second direction is perpendicular with a line along which one of the segments of the main trunk is oriented.

In the pixel unit of the present invention, the main trunk at least has two segments along a first direction, and an end of each of the segments has a protrusion or an indent.

In the pixel unit of the present invention, the main trunk at least has two segments along the second direction, and the two segments are crossed with each other, and the main trunk has a gap between the two segments.

Another object of the invention is to provide a liquid crystal display panel which has a main trunk that corresponds to an area without apparent dark zone, even no dark zone, so as to increase transmittance of liquid crystal display panel and improve the display effect of the liquid crystal display panel.

In order to solve the foregoing problem, the present invention provides a liquid crystal display panel comprising: a first substrate having multiple pixel units mounted thereon; a second substrate having a common electrode and a color filter mounted thereon, and the common electrode faces the pixel electrodes on the first substrate, and the color filter is disposed between the second substrate and the common electrode; a liquid crystal layer mounted between the pixel electrodes of the first substrate and the common electrode of the second substrate; each of the pixel unit has: a gate line; a source line; a drain line; an active element electrically connected to the gate line, the source line and the drain line; a pixel electrode including a main trunk and multiple strip electrodes; the main trunk is electrically connected to the drain line; the main trunk has a first predetermined angle with respect to a first polarization axis or a second polarization axis; and the main trunk at least has two segments; an end of each of the strip electrodes is connected to the main trunk; and each of the strip electrodes has a second predetermined angle with respect to the main trunk.

In the liquid crystal display panel of the present invention, the first predetermined angle is ranged from 5 to 85 degrees, and the second predetermined angle is ranged from 5 to 175 degrees.

In the liquid crystal display panel of the present invention, the main trunk at least has two segments along a first direction, and the first direction is parallel to a line along which one of the segments of the main trunk is oriented; or the main trunk at least has two segments along a second direction, and the two segments are crossed with each other, and the second direction is perpendicular with a line along which one of the segments of the main trunk is oriented.

In the liquid crystal display panel of the present invention, the main trunk at least has two segments along a first direction, and an end of each of the segments has a protrusion or an indent.

In the liquid crystal display panel of the present invention, the protrusion or the indent at least has two lateral surfaces forming an angle of 135 degrees or 45 degrees there.

Compared with the conventional technology, the present invention reduces dark areas in the area that the main trunk corresponds to, and thereby increases transmittance of liquid crystal display panel and improves the display effect of the liquid crystal display panel.

In order to make the contents of the present invention to be easily understood, below, the preferred embodiments of the present invention are described in detail in cooperation with accompanying drawings as follows:

DETAILED DESCRIPTION OF THE PREFERRED EMBODIMENTS

Figure 1:
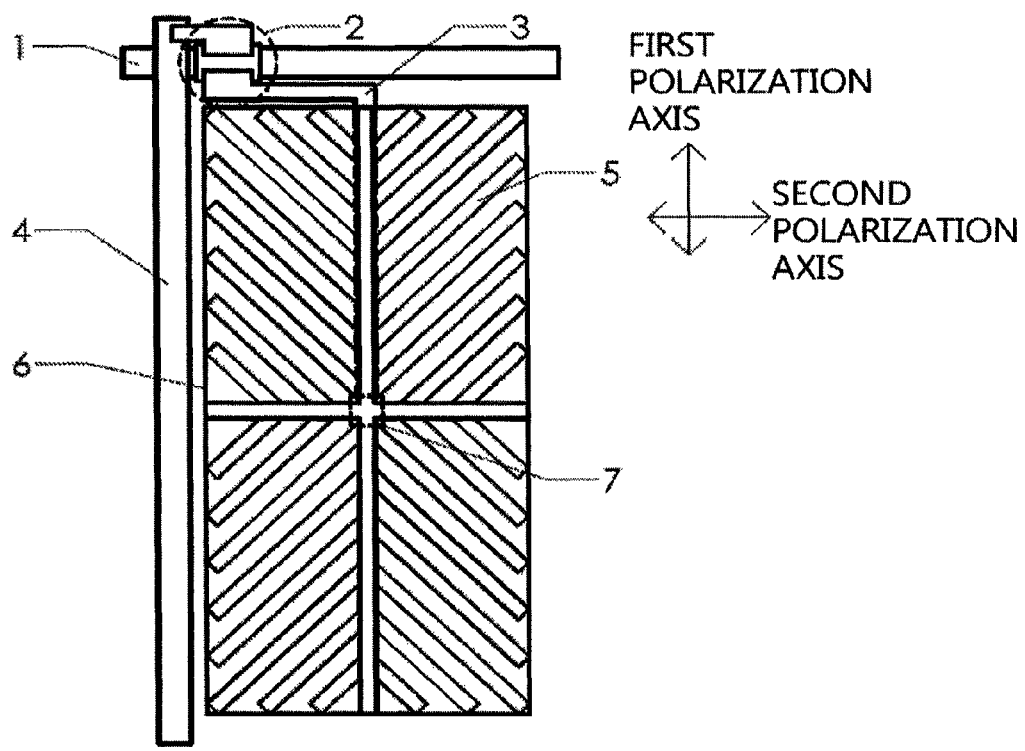
FIG. 1 is a top view of a pixel unit of a liquid crystal display panel in accordance with the prior art.

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, units with similar structure are labeled with the same reference number.

Figure 2:
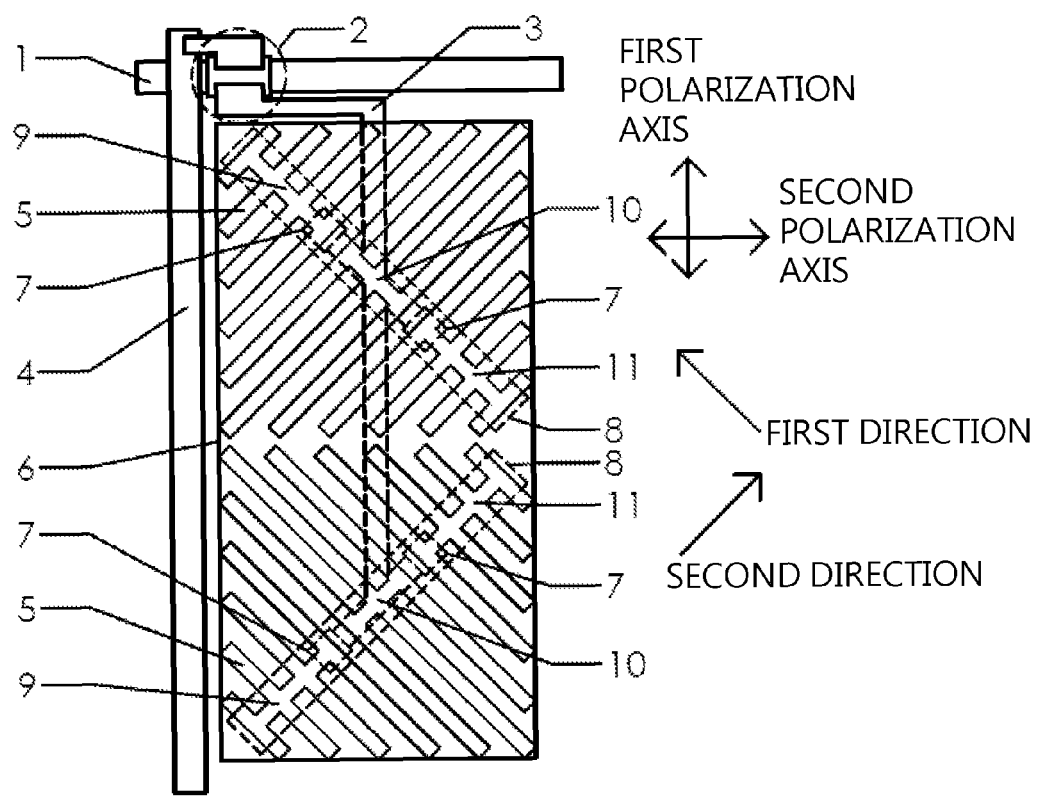
FIG. 2 is a top view of a first preferred embodiment of a pixel unit in accordance with the present invention.

With reference to FIG. 2, FIG. 2 is a top view of a first preferred embodiment of a pixel unit in accordance with the present invention. In FIG. 2, the pixel unit of the present invention comprises an active element 2, a source line 4, a gate line 1, a drain line 3 and a pixel electrode 6, wherein the pixel electrode 6 includes a main trunk 8 and multiple strip electrodes 5, the active element 2 is electrically source line 4 and the gate line 1, and the active element 2 is also electrically connected to the drain line 3, and the drain line 3 is electrically connected to the main trunk 8 through a contact hole 7. The main trunk 8 has a first predetermined angle with respect to a first polarization axis, and the angle is ranged from 5 to 85 degrees. Preferably, the first predetermined angle is 45 degrees. The strip electrodes 5 are electrically connected to the main trunk 8, and each of the strip electrodes 5 has a second predetermined angle with respect to the main trunk 8, and the second predetermined angle is ranged from 5 to 175 degrees. Preferably, the second predetermined angle is 90 degrees. In this embodiment, the main trunk 8 is divided into three segments along a first direction: a first segment 9, a second segment 10 and a third segment 11. In this embodiment, the first segment 9, the second segment 10 and the third segment 11 are collinear, and certainly the first segment 9, the second segment 10 and the third segment 11 may not be collinear, even not parallel. The drain line 3 is electrically connected to the first segment 9, the second segment 10 and the third segment 11 of the main trunk 8 through the contact hole 7. In this embodiment, an advantage of dividing the main trunks 8 along the first direction is that the main trunk 8 is prevented from being too long along in length along the first direction and thereby forming a dark area corresponding to the main trunk 8, therefore transmittance of the liquid crystal panel can be increased.

Figure 3:
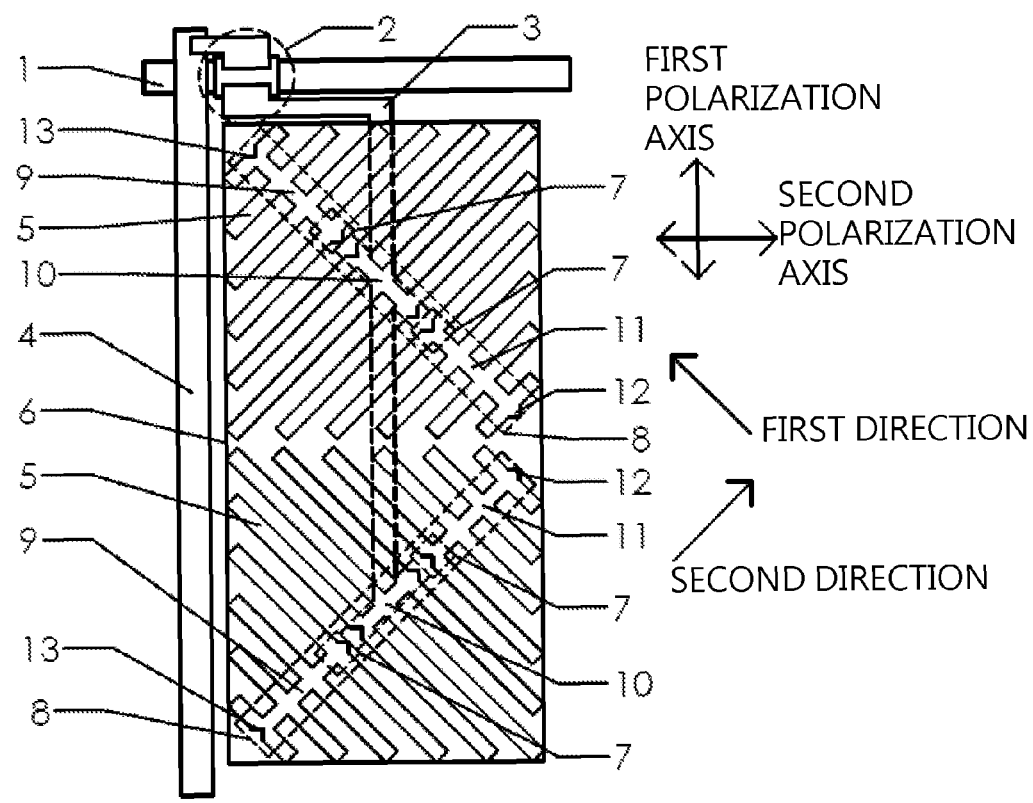
FIG. 3 is a top view of a second embodiment of the pixel unit in accordance with the present invention.

With reference to FIG. 3, FIG. 3 is a top view of a second preferred embodiment of the pixel unit in accordance with the present invention. This embodiment is similar to the first preferred embodiment, the main trunk 8 is divided into three segments along the first direction, an end of the first segment 9 close to the second segment 10 has a protrusion 12 mounted thereon, and the other end of the first segment 9 has an indentation 13 mounted thereon. An end of the second segment 10 close to the first segment 9 has an indentation mounted thereon, an end of the second segment 10 close to the third segment 11 has a protrusion 12 mounted thereon, and the other end of the third segment 121 has an protrusion 12 mounted thereon. The drain line 3 is electrically connected to the first segment 9, the second segment 10 and the third segment 11 of the main trunk 8 through the contact hole 7. The advantage of respectively mounting the protrusion 12 and the indentation 13 on the first segment 9 and the second segment 9 is to enhance the contribution that the electric field produced by the pixel electrode provides for tilting liquid crystal molecules.

Figure 4:
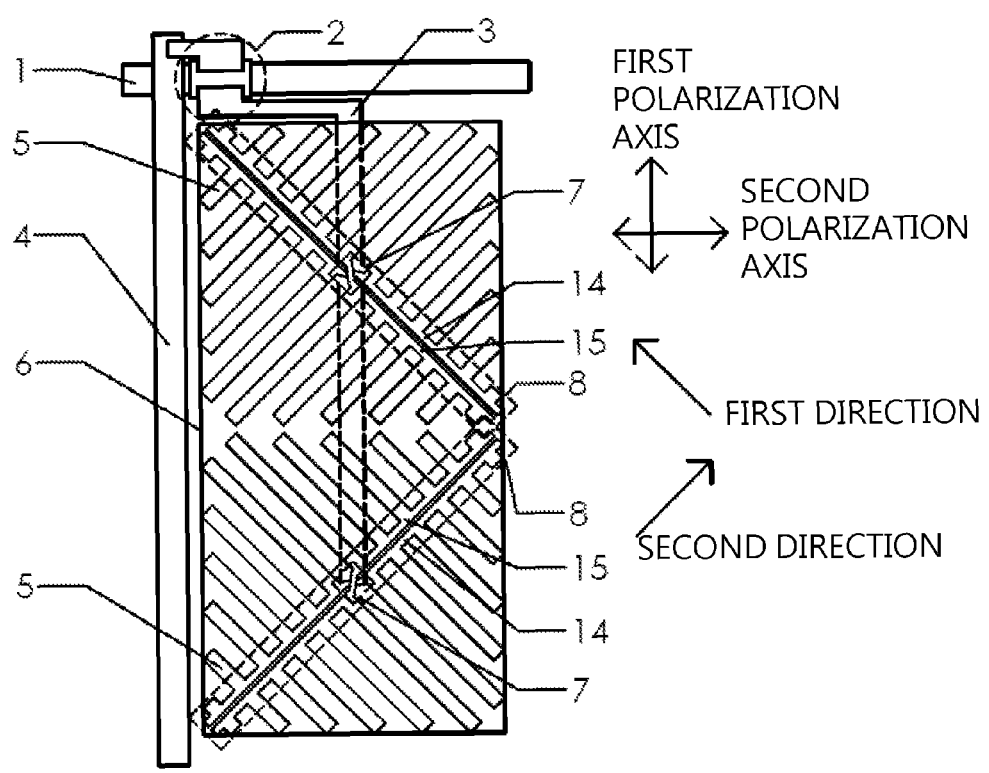
FIG. 4 is a top view of a third embodiment of the pixel unit in accordance with the present invention.

With reference to FIG. 4, FIG. 4 is a top view of a third embodiment of the pixel unit in accordance with the present invention. In this embodiment, the pixel unit comprises a source line 4, a gate line 1, an active element 2, a drain line 3 and a pixel electrode 6, wherein the pixel electrode 6 includes a main trunk 8 and multiple strip electrodes 5. The main trunk 8 is divided into two segments along a second direction: a fourth segment 14 and a fifth segment 15. An end of each of the strip electrodes 5 is electrically connected to the fourth segment 14 or the fifth segment 15. Each of the strip electrodes 5 has a second predetermined angle with respect to one segment of the main trunk 8, and the second predetermined angle is ranged from 5 to 175 degrees, and preferably, the second predetermined angle is 90 degrees. The main trunk 8 has a first predetermined angle with respect to a first polarization axis, and the first predetermined angle is ranged from 5 to 85 degrees. Preferably the first predetermined angle is 45 degrees. The drain line 3 is connected to the fourth segment 14 and the fifth segment 15 of the main trunk 8 through the contact hole 7. The fourth segment 14 and the fifth segment 15 are crossed with each other, and there is a gap between the fourth segment 14 and the fifth segment 15. In this embodiment, since the main trunk 8 is divided into the fourth segment 14 and the fifth segment 15, the main trunk 8 is prevented from being too wide in width along the second direction and forming a dark area, thereby transmittance of liquid crystal panel is increased. In the liquid crystal panel of the present invention, a protrusion 26 or a recess 25 may be mounted on a common electrode 21 in a position corresponding to the gap between the fourth segment 14 and the fifth segment 15, as shown in FIG. 6 and FIG. 7 or FIG. 6 and FIG. 8.

Figure 5:
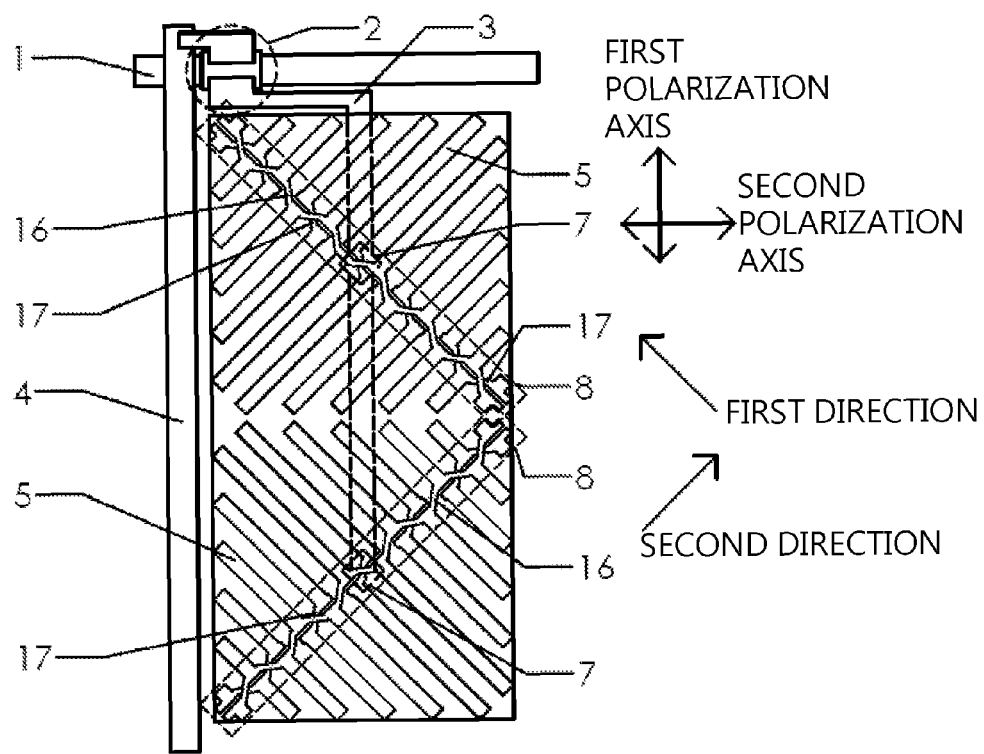
FIG. 5 is a top view of a fourth embodiment of the pixel unit in accordance with the present invention.

With reference to FIG. 5, FIG. 5 is a top view of a fourth embodiment of the pixel unit in accordance with the present invention. In FIG. 5, the pixel unit of the present invention includes a source line 4, a gate line 1, a drain line 3, an active element 2 and a pixel electrode 6. The active element 2 is electrically connected to the source line 4, the gate line 1 and the drain line 3. The drain line is electrically connected to the pixel electrode 6. The pixel electrode 6 has a main trunk 8 and multiple strip electrodes 5. The main trunk 8 has a first predetermined angle with respect to a first polarization axis. The first predetermined angle is ranged from 5 to 85 degrees. Preferably, the first predetermined angle is 45 degrees. An end of each of the strip electrodes 5 is connected to the main trunk 8, and each of the strip electrodes 5 has a second predetermined angle with respect to the main trunk 8, and the second predetermined angle is ranged from 5 to 175 degrees. Preferably, the second predetermined angle is 90 degrees. In this embodiment, the main trunk has segments along a first direction and a second direction. To be more specifically, the main trunk 8 has a sixth segment 16 and multiple seventh segments 17, and the sixth segment 16 and seventh segments 17 are crossed with each other. There is a gap between the sixth segment 16 and each seventh segment 17. The seventh segments 17 are arranged on the sixth segment 16 in a linear-array manner. The drain line 3 is electrically connected to the sixth segment 16 through the contact hole 7, and the sixth segment 16 is connected to the seven segments 17. In this embodiment, dividing the main trunk 8 into a sixth segment 16 and multiple seventh segment 17 prevents the main trunk 8 from being too long in length along the first direction and too wide in width along the second direction and thereby forming a dark area, therefore the transmittance of liquid crystal panel is increased. In the liquid crystal display panel of the present invention, a protrusion 26 or a recess 25 may be mounted on a common electrode 21 in a position corresponding to the gap between the sixth segment 16 and the seventh segments 17, as shown in FIG. 6 and FIG. 7 or FIG. 6 and FIG. 8.

Figure 6:
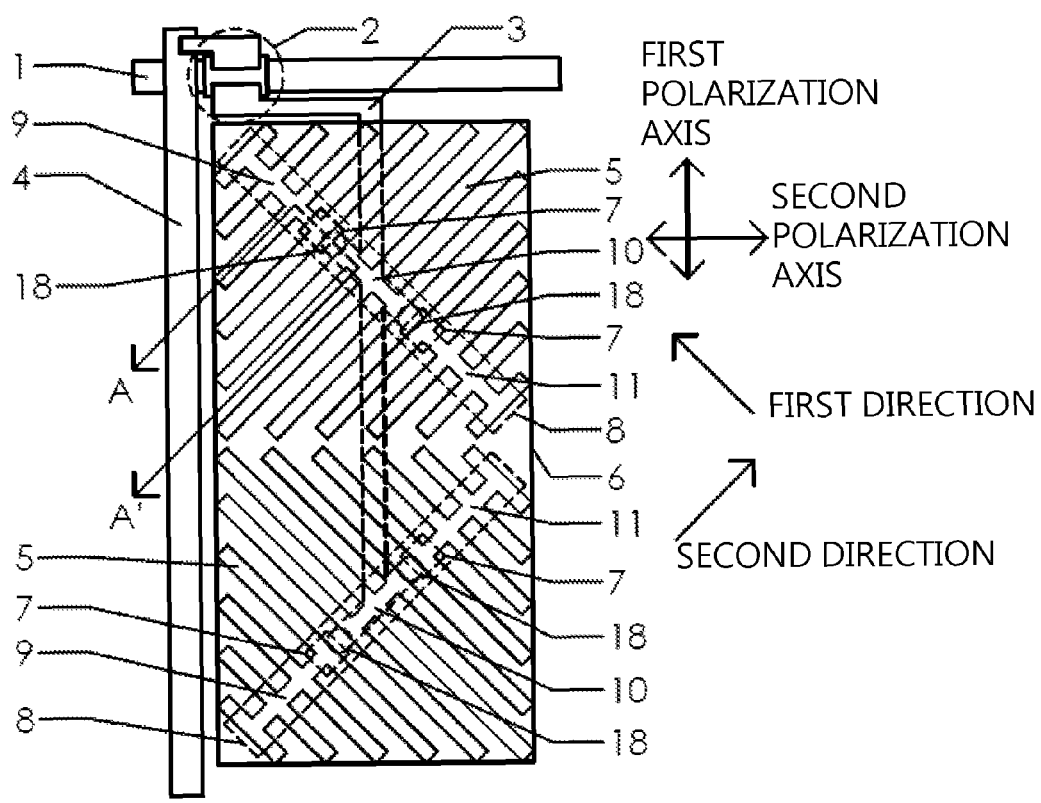
FIG. 6 is a top view of a first preferred embodiment of a liquid crystal display panel in accordance with the present invention.
Figure 7:
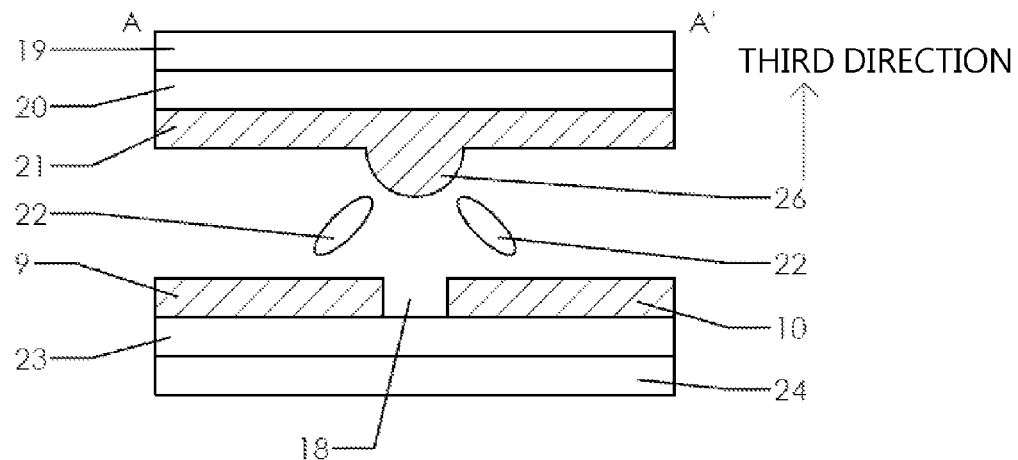
FIG. 7 is a scheme view in cross-section along the line A-A' in FIG. 6 according to a preferred embodiment.

With reference to FIG. 6 and FIG. 7, FIG. 6 is a top view of a first preferred embodiment of a liquid crystal display panel in accordance with the present invention, and FIG. 7 is a scheme view of a preferred embodiment in cross-section along the line A-A' in FIG. 6. In the liquid crystal panel of the present invention, a first substrate 24 has multiple pixel units, wherein each of the pixel units comprises a gate line 1, a source line 4, a drain line 3, an active element 5 and a pixel electrode 6. To be more specifically, along a third direction, the first substrate 24 has an insulation layer 23 and a pixel electrode 6 respectively mounted thereon (first segment 9 and second segment 10), along an opposite direction to the third direction, a second substrate 19 has a color filter 20 and a common electrode 21 respectively mounted thereon, wherein the first substrate 24 and the second substrate 19 are mounted parallelly with each other, and the second substrate 19 is mounted above the first substrate 24 along the third direction, and there is a liquid crystal layer 22 mounted between the pixel electrode 6 and the common electrode 21. The active element 2 is electrically connected to the source line 4, the gate line 1 and the drain line 3. The drain line 3 is electrically connected to the pixel electrode 6 through the contact hole 7. The pixel electrode 6 includes a main trunk 8 and multiple strip electrodes 5. The main trunk 8 has a first predetermined angle with respect to a first polarization axis, and the first predetermined angle is ranged from 5 degrees to 85 degrees. An end of each of the strip electrodes 5 is connected to the main trunk 8. Each of the strip electrodes 5 has a second predetermined angle with respect to the main trunk 8, and the second predetermined angle is ranged from 5 degrees to 175 degrees. Preferably, the second predetermined angle is 90 degrees. The main trunk 8 is divided into three segments along the first direction: a first segment 9, a second segment 10 and a third segment 11. There are gaps between the first segment 9 and the second segment 10 and between the second segment 10 and the third segment 11. The common electrode 21 has a protrusion 26 on a position 18 corresponding to the gap. Specifically, in this embodiment, the protrusion 26 is a hemispherical body. Certainly, the protrusion 26 may be in other shapes, for example, a side of the protrusion 26 at least includes two surfaces respectively having a 45-degree angle and a 135-degree angle with respect to a plane surface where the common electrode 21 is disposed on. In this embodiment, since the common electrode 21 has protrusions 26 mounted on positions corresponding to the gaps between the first segment 9 and the second segment 10 and the gaps between the second segment 10 and the third segment 11, under the premise of obtaining the same effect of liquid crystal tilting, the voltage for being applied to the pixel electrode 6 in this embodiment is relatively smaller than the voltage while no protrusion 26 is mounted.

Figure 8:
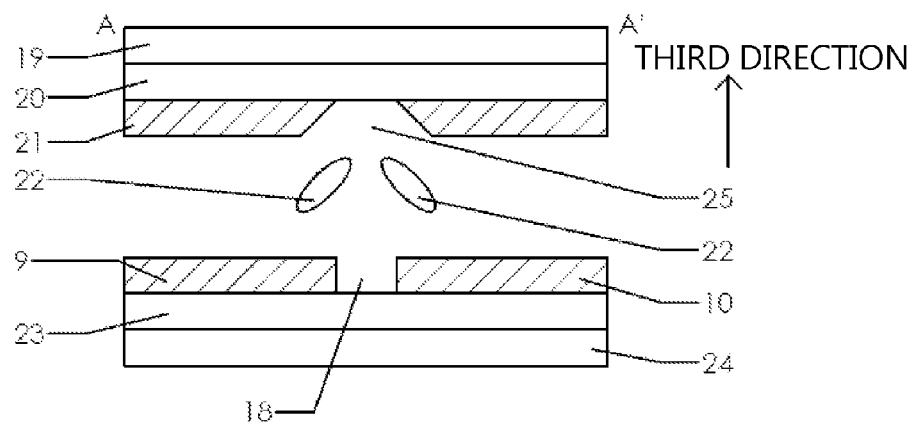
FIG. 8 is a scheme view in cross-section along the line A-A' in FIG. 6 according to another preferred embodiment.

With reference to FIG. 8, FIG. 8 is a scheme view in cross-section along the line A-A' in FIG. 6 according to another preferred embodiment. In FIG. 8, the first substrate 24, the insulation layer 23, the pixel electrode 6 (the first segment 9 and the second segment 10), the liquid crystal layer 22, the common electrode 21, the color filter 20 and the second substrate 19 are mounted orderly along the third direction. The main trunk 8 has a gap between the first segment 9 and the second segment 10, on a position 18 corresponding to the gap, the common electrode 21 has a recess 25, and the recess 25 has an opening facing a direction opposite to the third direction. Preferably, a cross-section of the recess 25 is an isosceles trapezoid, and each of the two legs of the isosceles trapezoid forms a 135-degree angle with respect to a plane surface where the common electrode 21 is disposed, it also means the recess at least has two side surfaces having a 135-degree angle or a 45-degree angle with respect to the plane surface where the common electrode 21 is disposed. The advantage of the foregoing means is to make the pixel electrode 6 to produce the most appropriate electric field for the liquid crystal molecules 22 to tilt under the premise of applying smallest voltage to the pixel electrode 6.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A pixel unit comprising:
a gate line;
a source line;
a drain line;
an active element electrically connected to the gate line, the source line and the drain line;
a pixel electrode being disposed within a rectangular area restricted by the gate line and the source line and including two separated main trunks and multiple strip electrodes; the main trunks are electrically connected to the drain line together so that the main trunks are electrically connected to each other via the drain line; each one of the main trunks has a first predetermined angle with respect to a first polarization axis or a second polarization axis of a polarizer; and each one of the main trunks is split into at least two segments; an end of each of the strip electrodes is connected to the corresponding main truck within the rectangular area so that each one of the trunks connected to the strip electrodes is comb-like; and each of the strip electrodes has a second predetermined angle with respect to the corresponding main trunk;
the first predetermined angle is ranged from 5 to 85 degrees, and the second predetermined angle is ranged from 5 to 175 degrees;
one of the main trunks is split into at least two segments along a first direction while the other one of the main trunks is split into at least two segments along a second direction perpendicular to the first direction, and an end of each of the segments has a protrusion or an indentation.

2. The pixel unit as claimed in claim 1, wherein the first predetermined angle is 45 degrees.

3. The pixel unit as claimed in claim 1, wherein the second predetermined angle is 90 degrees.

4. A pixel unit, comprising:
a gate line;
a source line;
a drain line;
an active element electrically connected to the gate line, the source line and the drain line;
a pixel electrode being disposed within a rectangular area restricted by the gate line and the source line and including two separated main trunks and multiple strip electrodes; the main trunks are electrically connected to the drain line together so that the main trunks are electrically connected to each other via the drain line; each one of the main trunks has a first predetermined angle with respect to a first polarization axis or a second polarization axis of a polarizer; and each one of the main trunks is split into at least two segments; an end of each of the strip electrodes is connected to the corresponding main truck within the rectangular area so that each one of the trunks connected to the strip electrodes is comb-like; and each of the strip electrodes has a second predetermined angle with respect to the corresponding main trunk.

5. The pixel unit as claimed in claim 4, wherein the first predetermined angle is ranged from 5 to 85 degrees, and the second predetermined angle is ranged from 5 to 175 degrees.

6. The pixel unit as claimed in claim 4, wherein one of the main trunks is split into at least two segments along a first direction while the other one of the main trunks is split into at least two segments along a second direction perpendicular to the first direction.

7. The pixel unit as claimed in claim 6, wherein an end of each of the segments has a protrusion or an indentation.

8. A liquid crystal display panel, comprising:
a first substrate having multiple pixel units mounted thereon;
a second substrate having a common electrode and a color filter mounted thereon, and the common electrode faces the pixel units on the first substrate, and the color filter is disposed between the second substrate and the common electrode;
a liquid crystal layer mounted between the pixel units of the first substrate and the common electrode of the second substrate;
each of the pixel unit has:
a gate line;
a source line;
a drain line;
an active element electrically connected to the gate line, the source line and the drain line;
a pixel electrode being disposed within a rectangular area restricted by the gate line and the source line and including two separated main trunks and multiple strip electrodes; the main trunks are electrically connected to the drain line together so that the main trunks are electrically connected to each other via the drain line; each one of the main trunks has a first predetermined angle with respect to a first polarization axis or a second polarization axis of a polarizer; and each one of the main trunks is split into at least two segments; an end of each of the strip electrodes is connected to the corresponding main truck within the rectangular area so that each one of the trunks connected to the strip electrodes is comb-like; and each of the strip electrodes has a second predetermined angle with respect to the corresponding main trunk.

9. The liquid crystal display panel as claimed in claim 8, wherein the first predetermined angle is ranged from 5 to 85 degrees, and the second predetermined angle is ranged from 5 to 175 degrees.

10. The liquid crystal display panel as claimed in claim 8, wherein one of the main trunks is split into at least two segments along a first direction while the other one of the main trunks is split into at least two segments along a second direction perpendicular to the first direction, and an end of each of the segments has a protrusion or an indentation.

11. The liquid crystal display panel as claimed in claim 10, wherein a protrusion or a recess is formed on the common electrode in a position corresponding to a gap between the segments of the main trunk.

12. The liquid crystal display panel as claimed in claim 11, wherein the recess at least has two side surfaces having a 135-degree angle or a 45-degree angle with respect to the plane surface where the common electrode is disposed.

\* \* \* \* \*